United States Patent
Orita

(10) Patent No.: US 7,322,450 B2
(45) Date of Patent: Jan. 29, 2008

(54) ROTATING DAMPER

(75) Inventor: Nobutoshi Orita, Tokyo (JP)

(73) Assignee: Tok Bearing Co., Ltd., Tokyo (JP)

( * ) Notice: Subject to any disclaimer, the term of this patent is extended or adjusted under 35 U.S.C. 154(b) by 0 days.

(21) Appl. No.: 11/464,323

(22) Filed: Aug. 14, 2006

(65) Prior Publication Data
US 2006/0289257 A1   Dec. 28, 2006

Related U.S. Application Data

(62) Division of application No. 10/949,450, filed on Sep. 24, 2004, now Pat. No. 7,111,712.

(30) Foreign Application Priority Data
Oct. 6, 2003   (JP) .............................. 2003-346621

(51) Int. Cl.
*F16S 57/02* (2006.01)
(52) U.S. Cl. ...................... 188/296; 188/290
(58) Field of Classification Search ................ 188/290, 188/293, 294, 296; 4/246.2, 236, 240; 16/54, 16/82, 85
See application file for complete search history.

(56) References Cited

U.S. PATENT DOCUMENTS 5,152,189 A * 10/1992 Miura et al. ................. 464/180
5,720,370 A * 2/1998 Takahashi .................... 188/310
2002/0179387 A1* 12/2002 Orita .......................... 188/290
2003/0234145 A1* 12/2003 Iwashita ..................... 188/290

FOREIGN PATENT DOCUMENTS

| JP | 7-301272 | * 11/1995 |
|----|----------|-----------|
| JP | 9-280290 | 10/1997 |
| JP | 10-211025 | 8/1998 |

* cited by examiner

*Primary Examiner*—Devon Kramer
(74) *Attorney, Agent, or Firm*—Wolf, Block, Schorr & Solis-Cohen LLP

(57) ABSTRACT

An adequate rotation angle is ensured and any member is not damaged due to fluid resistance even with use of highly viscous fluid. A rotating shaft (2) is provided inside a casing (1) having first divider walls (5) provided on its inner periphery and in direct or indirect contact with the rotating shaft. Second divider walls (4) are provided on an outer periphery of the rotating shaft and in either direct or indirect contact with the casing. A flow passage (4*a*) is provided in the second divider wall for fluid communication between the pressure chambers. A check valve mechanism has curving portions (6*a*) moving on and along the periphery of the rotating shaft and valving portions (6*b*) each joining to the curving portion. The curving portion is supported between the rotating shaft and the first divider wall. The flow passage is opened/closed depending upon a direction of fluid flow.

2 Claims, 21 Drawing Sheets

ROTATING DAMPER

BACKGROUND OF THE INVENTION

1. Field of the Invention

This invention relates to a damper that rotates to moderate rotational movement of a cover shifting between open and closed positions or the like.

2. Description of the Related Art

Rotating dampers having a damping function of reducing rotational speed of piano key covers, toilet seats and the like are known, such as disclosed in Japanese unexamined patent publications No. Hei.10-211025 (hereinafter referred to as "reference 1") and No. Hei.9-280290 (hereinafter referred to as "reference 2").

The rotating damper, as described in the references, typically includes a rotating shaft provided in a cylindrical casing, divider walls that project from the inner peripheral surface of the casing toward the rotating shaft, and blades that project from the outer peripheral surface of the rotating shaft toward the inner peripheral surface of the casing. A valve body controls fluid flow between pressure chambers each defined by the divider wall and the blade.

More specifically, the valve body is operated to open and close a flow passage formed in the blade in accordance with a rotating direction of the rotating shaft in order to change fluid resistance based on the rotating direction. The rotating damper is structured such that the rotating shaft rotates at lower speeds when rotating in the direction that increases the fluid resistance. Therefore, the rotating damper is used in such a manner that fluid resistance decreases when the rotating shaft rotates in the direction that opens the piano key cover, the seat/seat cover or the like, and the fluid resistance increases when the rotating shaft rotates in the opposite direction, for example.

Among such rotating dampers are the ones disclosed in the referenced reference 1 and reference 2.

For example, the aforementioned rotating damper can be used for reducing a lowering speed of a toilet seat to cushion impact. However, recent mainstream toilet seats incorporate heaters, and are therefore heavy in weight. One possible way to reduce the lowering speed of the weighted toilet seat or other such objects, may be to increase the viscosity of the viscous fluid sealed in the casing of the rotating damper. Highly viscous fluid to be used can include, for example, highly viscous grease, crude rubber, clay or the like.

However, in structure of the damper described in reference 1, the valve body mounted on the blade repeats its bending movement in response to fluid pressure produced by rotation of the rotating shaft to open/close the flow passage. A problem arising in such structure having a valve body repeating bending movement is that the durability of the valve body cannot be guaranteed. In particular, when the rotating damper is filled with highly viscous fluid to provide higher torque, the valve body is placed under higher pressure, and therefore becomes more susceptible to damage. Hence, a damper in which the flow passage is adjusted by means of the bending movement of a valve body as described above is inadequate for use as high torque dampers.

On the other hand, in the damper described in reference literature 2, the valve body is mounted along the outer periphery of the rotating shaft and allowed to move in a circumferential direction. The valve body opens and closes the flow passage formed in the blade. This valve body does not incorporate repetitive bending movement in relation to fluid pressure, and therefore there is no problem of damaging at the bending portion of the valve body. However, in order to hold the valve body within its traveling range around the rotating shaft, another blade for holding the valve body is provided outside of the blade in which the flow passage is formed and flow in the flow passage is controlled by the valve body. In other words, the blade for holding the valve body is provided in the range of relative rotation of the rotating shaft and the casing.

In the rotating damper as described above, the rotation of the rotating shaft relative to the casing is limited by obstruction of the blade by the divider wall. For this reason, if the blade holding the valve body projects from the outer periphery of the rotating shaft as in the damper of reference literature 2, this reduces the rotating range of the rotating shaft. If such a damper is filled with highly viscous fluid for use as a high-torque damper, the thickness of the blade and/or the valve body must be increased in the circumferential direction in order to withstand high fluid resistance. As a result, a sufficient rotation angle may not be ensured. If the rotation angle is insufficient, problems may yet arise, such as the impossibility of retaining the opening state of the cover that stays in a horizontal position in the closing state.

SUMMARY OF THE INVENTION

It is an object of the present invention to provide a rotating damper which is capable of ensuring an adequate rotation angle and has structure causing no damage to any member due to fluid resistance, particularly with use of highly viscous fluid.

According to a first aspect of the present invention, a rotating damper comprises: a rotating shaft that is provided inside a casing and is rotatable relatively to the casing; first divider walls that are provided on an inner periphery of the casing and in either direct or indirect contact with the rotating shaft; second divider walls that are provided on an outer periphery of the rotating shaft and in either direct or indirect contact with the inner periphery of the casing; a plurality of pressure chambers defined by the first and second divider walls; a limiting mechanism for limiting a flow of fluid between the pressure chambers; a check valve mechanism for permitting a flow of fluid in one direction from one pressure chamber to an adjacent pressure chamber, but inhibiting a flow of fluid from the adjacent pressure chamber to the one pressure chamber; and a flow passage provided in each of the second divider walls for communication of the fluid between the pressure chambers. The check valve mechanism has curving portions that move on and along the periphery of the rotating shaft, and valving portions that each join to the curving portion. Each of the curving portions is supported between the rotating shaft and the first divider wall. Depending upon turning movement of the check valve mechanism, each of the valving portions opens the flow passage for the flow of fluid in the direction from the one pressure chamber to the adjacent pressure chamber, and closes the flow passage for the flow of fluid from the adjacent pressure chamber to the one pressure chamber.

According to a second aspect of the present invention, a rotating damper comprises: a rotating shaft that is provided inside a casing and rotatable relatively to the casing; first divider walls that are provided on an inner periphery of the casing and in either direct or indirect contact with the rotating shaft; second divider walls that are provided on an outer periphery of the rotating shaft and in either direct or indirect contact with the inner periphery of the casing; a plurality of pressure chambers defined by the first and second divider walls; a limiting mechanism for limiting a flow of fluid between the pressure chambers; a check valve mechanism for permitting a flow of fluid in one direction from one pressure chamber to an adjacent pressure chamber, but inhibiting a flow of fluid from the adjacent pressure chamber to the one pressure chamber; and a flow passage provided in the first divider wall for communication of the fluid between the pressure chambers. The check valve mechanism has curving portions that move on and along an inner periphery of the casing, and valving portions that each join to the curving portion. Each of the curving portions is supported between the casing and the second divider wall. Depending upon turning movement of the check valve mechanism, each of the valving portions closes the flow passage for the flow of fluid in the direction from the one pressure chamber to the adjacent pressure chamber, and closes the flow passage for the flow of fluid from the adjacent pressure chamber to the one pressure chamber.

The check valve mechanism in the first and second aspects is capable of being made without a member for holding the valve body provided within the range of relative rotation of the rotating shaft and the casing. As a result, a large rotation angle is ensured. Especially, when highly viscous fluid is used in order for the rotating damper to serve as a high torque damper, if each component inside the casing is increased in thickness enough that no damage is incurred from viscous resistance, it is possible to realize the necessary rotation angle.

Further, in the first and second aspects, notches can be formed in one of three places of the curving portion, the outer periphery of the rotating shaft, and an inner periphery of the casing. Timing of activation of the limiting mechanism is adjusted in accordance with a relative position of the notch and either the first divider walls or the second divider walls.

In the above idea, it is possible to adjust timing when the flow limiting mechanism functions in accordance with rotation angle.

BRIEF DESCRIPTION OF THE INVENTION

DETAILED DESCRIPTION OF THE PREFERRED EMBODIMENTS

FIGS. 1 to 5 illustrate a rotating damper of a first embodiment according to the present invention.

Figure 1:
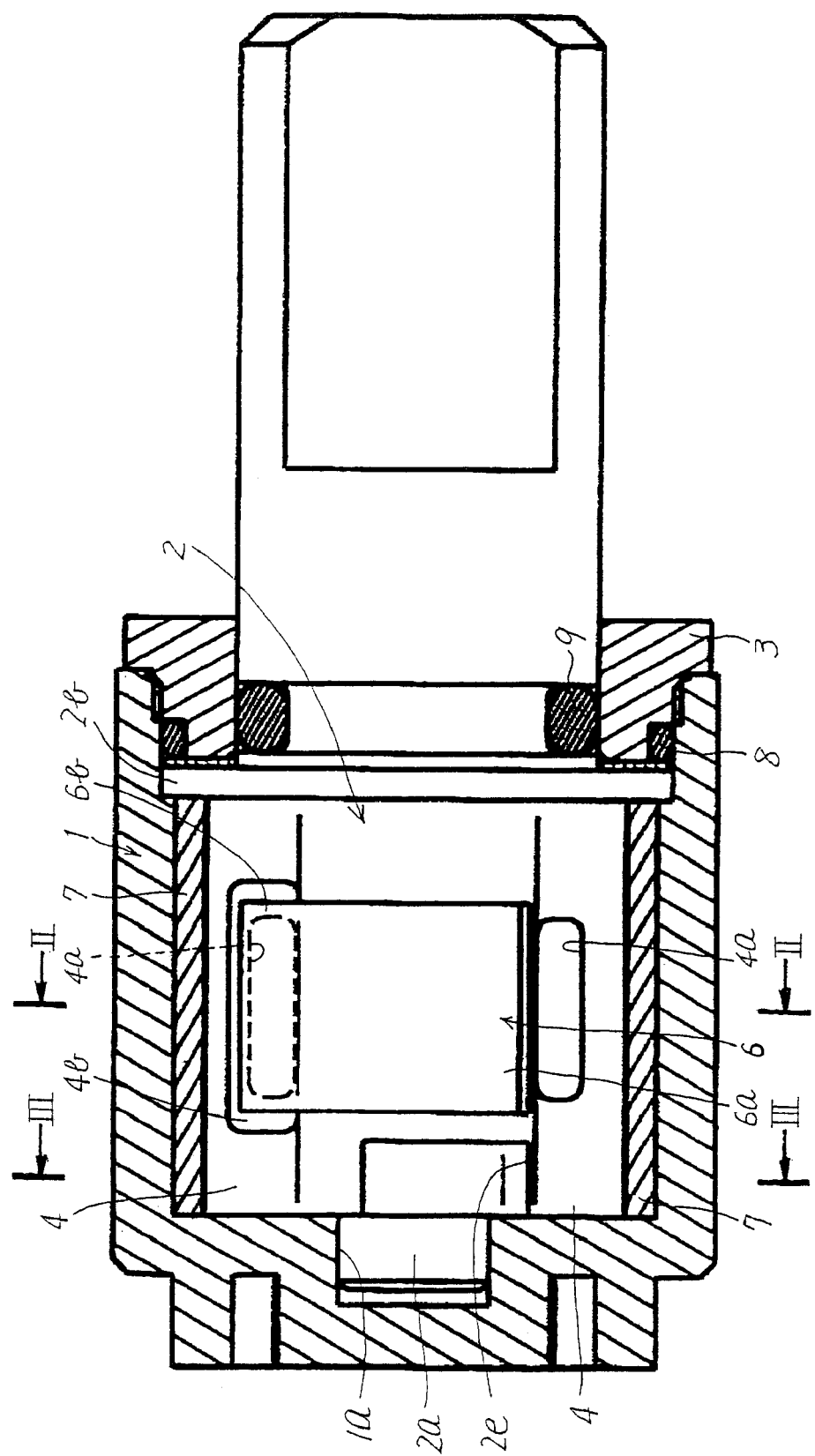
FIG. 1 is a sectional view of a rotating damper of a first embodiment.

FIG. 1 is a sectional view along the axis of the rotating damper. FIGS. 2 to 5 are cross-sectional views of the rotating damper in a direction perpendicular to a rotating shaft. Incidentally, FIG. 1 is not a cross section of the rotating shaft 2.

The rotating damper of the first embodiment includes a cylindrical casing 1 into which a rotating shaft 2 is inserted to allow for relative rotation to the casing 1. An open end of the casing 1 is closed with a cap 3. The rotating shaft 2 has a protrusion 2a formed on a leading end for insertion, and a flange 2b formed in a position back from the leading end for insertion.

The casing 1 has a recess 1a formed at the other end for receiving the insertion of the protrusion 2a. The protrusion 2a is fitted into the recess 1a and the flange 2b is attached to and fixed by the cap 3, so that the rotating shaft 2 is supported.

A pair of blades 4 is formed on the outer periphery of the rotating shaft 2. A pair of divider walls 5 is formed on the inner periphery of the casing 1. Four pressure chambers A, B, C and D are formed in the casing by the blades 4 and the divider walls 5.

The pressure chambers are varied in capacity by relative rotation between the rotating shaft 2 and the casing 1. In the first embodiment, the capacities of the pressure chambers A and C remain equal though variant, as do the capacities of the pressure chambers B and D.

In the blade 4 which creates a partition between the pressure chambers A and B, a flow passage 4a passes through in the rotating direction, and a graded step 4b against which a valve body 6, described later, makes contact is formed. An approximately C-shaped spacer 7 is located on a leading end of the blade 4, and is in direct contact with the inner periphery of the casing 1. The spacer 7 is combined with the leading end of the blade 4 so that the two move together. The blade 4 is in contact with the casing 1 via the spacer 7.

In the spacer 7, a flow passage 7a is formed in a position corresponding to the flow passage 4a formed in the blade 4. A notch portion 7b is formed in such a manner as to adjoin with the graded step 4b formed in the blade 4, which in turn allows for movement of the valve body 6.

Thus, the valve body 6 is mounted on the outer periphery of the rotating shaft 2, and includes curving portions 6a along the rotating shaft 2, and valving portions 6b. Each of the valving portions 6b is joined to the corresponding curving portion 6a and extends from the rotating shaft 2 in the diameter direction.

A pair of band-shaped recesses 2c is formed on and along the outer periphery of the rotating shaft 2 in a central portion in the axis direction. The recess 2c has a depth equal to the thickness of the curving portion 6a. Each of the curving portions 6a of the valve body 6 is fitted into the corresponding recess 2c so that the curving portion 6s winds around the rotating shaft 2. A leading end of each of the divider walls 5 provided on the inner periphery of the casing 1 comes in contact with the curving portion 6a. The curving portions 6a are supported between the divider walls 5 and the rotating shaft 2, so that the valve body 6 is retained.

The curving portion 6a has a length in the circumferential direction shorter than that of the band-shaped recess 2c. When the vavling portion 6b comes into contact with the blade 4, a gap 2d is created between the band-shaped recess 2c and the end of the curving portion 6a opposite to the valving portion 6b.

Figure 2:
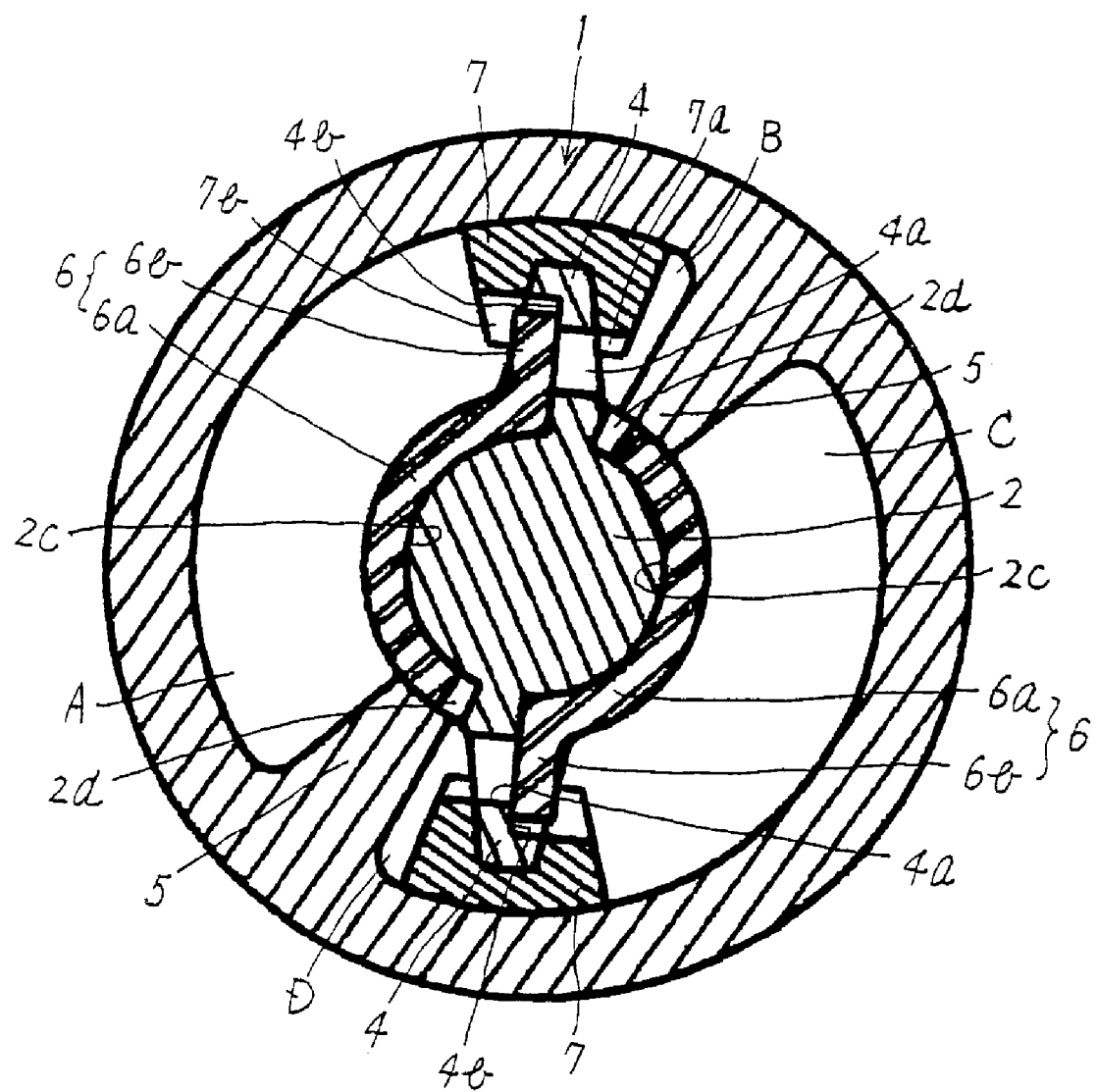
FIG. 2 is a sectional view taken along the II-II line in FIG. 1.

Accordingly, the curving portion 6a is rotationally movable within the range of the gap 2d. In other words, the valve body 6 is capable of rotating relative to the rotating shaft 2 at an angle corresponding to the gap 2d. As shown in FIG. 2, when the valving portion 6b is in contact with the blade 4, the flow passage 4a is closed. When the valving portion 6b is rotated counterclockwise in FIG. 2 on the rotating shaft 2 within the range of the gap 2d, and moves away from the blade 4, the flow passage 4a is opened.

Note that the aforementioned divider walls 5 correspond to first divider walls of the present invention. The blades 4 correspond to second divider walls of the present invention. The blade 4 is in indirect contact with the inner periphery of the casing 7 via the spacer 7.

Figure 3:
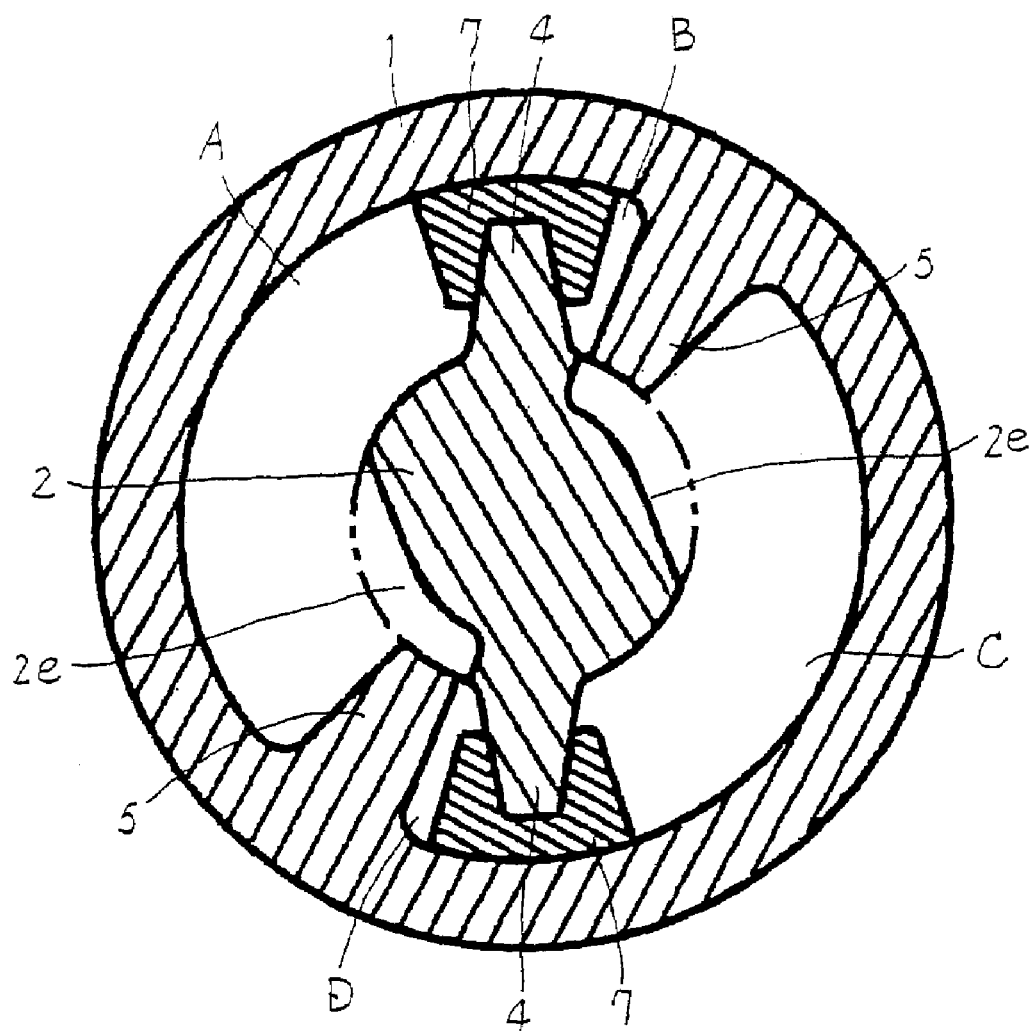
FIG. 3 is a sectional view taken along the III-III line in FIG. 1.

Further, bypass grooves 2e are formed in portion of the outer periphery of the rotating shaft 2 on which the curving portions 6a of the valve body 6 are not provided (see FIGS. 1 and 3). The bypass grooves 2e function as bypasses for establishing communication between the pressure chambers A and D and between the pressure chambers B and C when each of the leading end faces of the divider walls 5 partially faces or overlaps the bypass grooves 2e.

A portion with the curving portions 6a of the valve body 6 and a potion without the curving portions 6a are each present on the periphery of the rotating shaft 2, but both are herein included in the outer periphery of the rotating shaft 2.

FIG. 1 also shows O-rings 8 and 9.

Next, the operation of the rotating damper is described with reference to FIGS. 4 and 5 which are both sectional views taken along the II-II line in FIG. 1 as in FIG. 2 for illustrating the rotating shaft 2 rotated relative to the casing 1. The pressure chambers A and C of the four pressure chambers A to D are operated in the same manner and the pressure chambers B and D are operated in the same manner. Therefore, the descriptions are herein given mainly using the pressure chambers A and B for the purpose of clarity.

Figure 4:
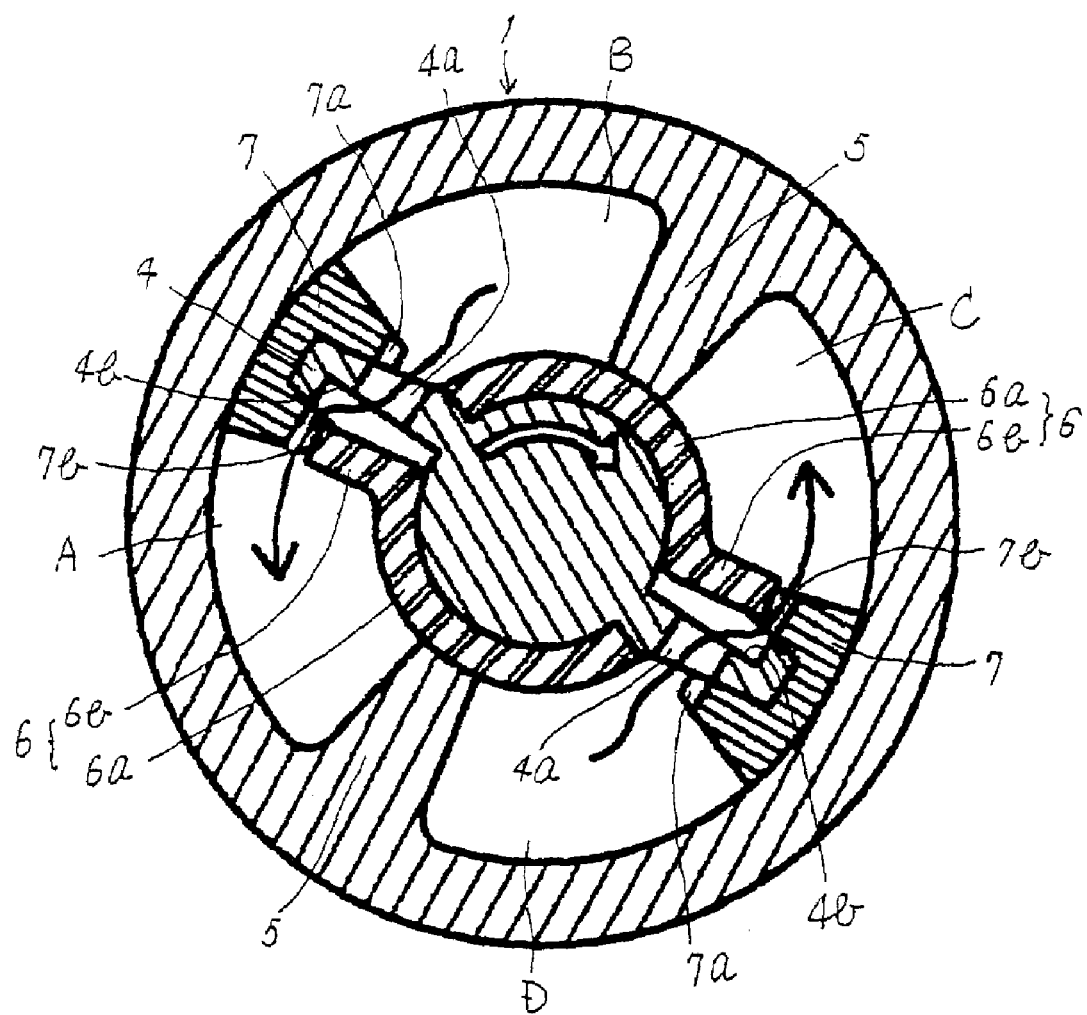
FIG. 4 illustrates action of the rotation damper of the first embodiment, in which a rotating shaft rotates clockwise.

As shown in FIG. 4, when the rotating shaft 2 rotates clockwise in FIG. 4, the pressure chamber A expands, while the pressure chamber B contracts in capacity, therefore allowing internal pressure of the pressure chamber B to build up. This built-up pressure acts on the valving portion 6b via the flow passage 4a of the blade 4 of the rotating shaft 2, so that the valve body 6 rotates in a direction moving away from the blade 4. Accordingly, the flow passage 4a is opened and the pressure chambers A and B communicate with each other through the flow passage 4a and the notch portion 7b.

In the state shown in FIG. 4, the divider wall 5 is placed within range of the bypass groove 2e formed in the outer periphery of the rotating shaft 2 (see FIG. 3), so that the pressure chamber B also communicates with the pressure chamber C.

Even if the rotating shaft 2 is rotated in the direction where the internal pressure of the pressure chamber B is built up in this manner, the fluid in the pressure chamber B will flow into the pressure chamber A via the large flow passage 4a, and also flow into the pressure chamber C via the bypass groove 2e serving as a notch dependant upon the relative position of the divider wall 5. As a result, the rotating shaft 2 becomes easy to rotate. That is, when the rotating shaft 2 is rotated clockwise in FIG. 4, the flow of the fluid is not particularly limited.

Figure 5:
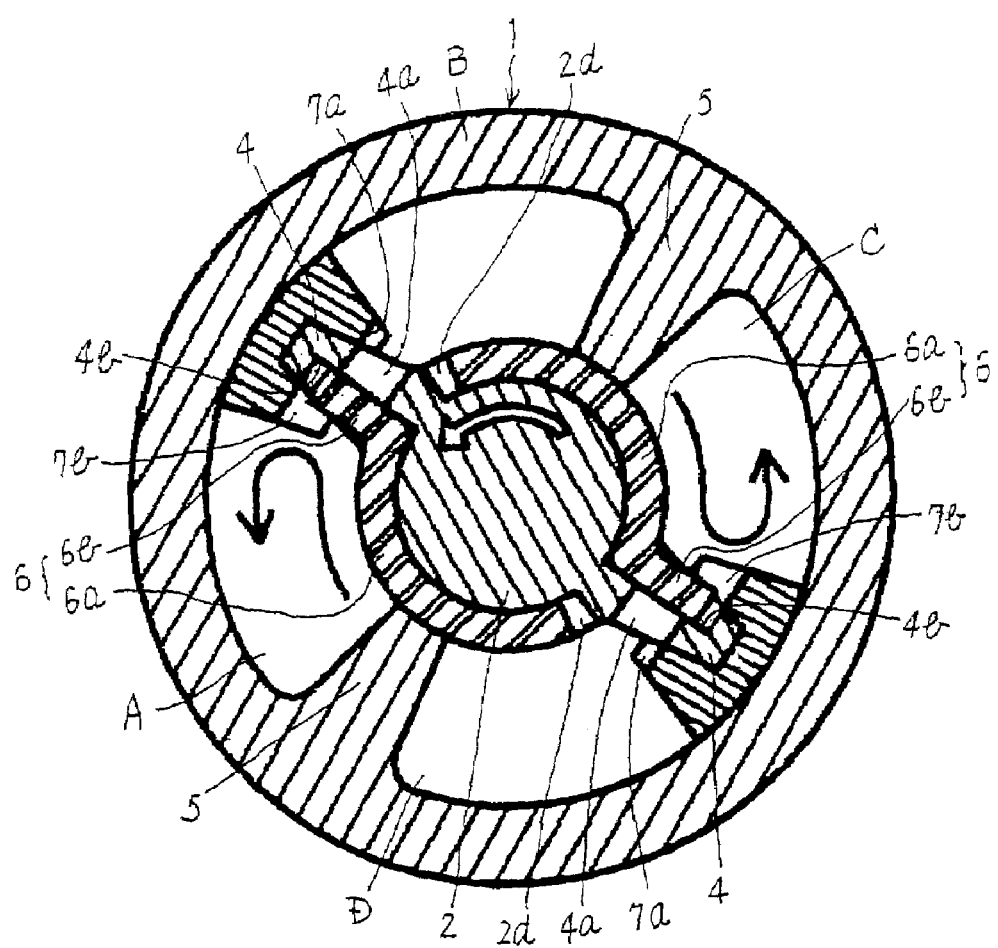
FIG. 5 illustrates action of the rotation damper of the first embodiment, in which a rotating shaft rotates counterclockwise.

On the contrary, FIG. 5 shows the state when the rotating shaft 2 is rotated counterclockwise. In contrast to the above case of clockwise rotation, the pressure chamber A is compressed. The fluid pressure in the pressure chamber A acts on the valving portion 6b. Thereupon, the valve body 6 rotates in the direction opposite to the rotating shaft 2. Then, the valving portion 6b is pressed against the flow passage 4a to block the flow passage 4a. When the flow passage 4a is blocked, and the divider wall 5a is placed within range of the bypass groove 2e of the rotating shaft 2, the fluid in the pressure chamber A flows into the pressure chamber D via the bypass groove 2e. Resistance at this point is designed to be much the same as that as when the flow passage 4a is opened. Hence, in the above range, the damper function is not exerted. Note that, resistance produced when viscous fluid flows through the bypass groove 2e can be adjusted through the width or depth of the bypass groove 2e.

The rotating shaft 2 is further rotated counterclockwise in FIG. 5. In this case, the bypass groove 2e moves past the leading end of the divider wall 5, which then blocks the communications between the pressure chambers A and D and between the pressure chambers B and C via the bypass grooves 2e. Thereupon, the fluid in the pressure chamber A flows into the pressure chamber B via a slight clearance between the spacer 7 and the inner periphery of the casing 1, as well as into the pressure chamber D via a slight clearance between the outer periphery of the rotating shaft 2 and the leading end of the divider wall 5. Further, the fluid in the pressure chamber C flows into the pressure chambers D via a slight clearance between the spacer 7 and the inner periphery of the casing 1, as well as into the pressure chamber B via a slight clearance between the outer periphery of the rotating shaft 2 and the leading end of the divider wall 5.

In this manner, the fluid flow between pressure chambers occurs only via the slight clearances between the spacer 7 and the inner periphery of the casing 1 and the between the outer periphery of the rotating shaft 2 and the leading end of the divider wall 5. The fluid flow between pressure chambers is limited. That is, the clearance corresponds to a flow limiting mechanism of the present invention. The bypass groove 2e corresponds to a notch formed in the outer periphery of the rotating shaft of the present invention.

When the rotating shaft 2 is rotated counterclockwise in FIG. 5 and the limiting mechanism functions, the damper function is exerted and the rotation of the rotating shaft 2 is slower.

For example, when the rotating damper of the first embodiment is used in a toilet seat or the like, the rotating damper may be mounted in such a way that the clockwise rotation of the rotating shaft 2 as shown in FIG. 4 is applied as a rotation for raising the toilet seat and the counterclockwise rotation as shown in FIG. 5 is applied as a rotation for lowering the toilet seat.

In such a rotating damper, the movable range of the rotating shaft 2 is from one point where the blade 4 is in contact with one divider wall 5 to a point where the blade 4 comes into contact with the other divider wall 5.

The valving portion 6b for closing and opening the flow passage 4a is maintained by the curving portion 6a. For this reason, as compared with a conventional case in which a member for maintaining the valve body is provided in the pressure chamber, it is possible to ensure a large rotation angle. In particular, when high viscous fluid is used, high pressure acts on the valving portion 6b of the valve body 6. Therefore, if the thickness of the valving portion 6b is increased to the extent that it can withstand the pressure, the movable range is not reduced.

In the first embodiment, the spacer 7 is attached to the leading end of the blade 4 of the rotating shaft 2. Without the use of the spacer 7, the leading end of the blade 4 may come into direct contact with or may approach the inner periphery of the casing 1. If the blade 4 and the spacer 7 are designed as different members as described above, the clearance between the inner peripheral surface of the casing 1 and the contact surface of the spacer 7 may be easily produced with precision.

However, if the spacer 7 is omitted or maintains less contact with the casing 1, it is possible to further extend the rotation range of the rotating shaft 2.

In the first embodiment, by providing the bypass groove 2e, the limiting mechanism will either act or not act depending on the relative position of the divider wall 5 and the rotating shaft 2 when the rotating shaft 2 is rotated counterclockwise. In other words, the timing of activation of the flow limiting mechanism is adjusted. However, the bypass groove 2e is not absolutely necessary. If the bypass groove 2e is not provided, the limiting mechanism functions at all times regardless of the relative position of the divider wall 5 and the rotating shaft 2 when the rotating shaft 2 is rotated counterclockwise.

Figure 6:
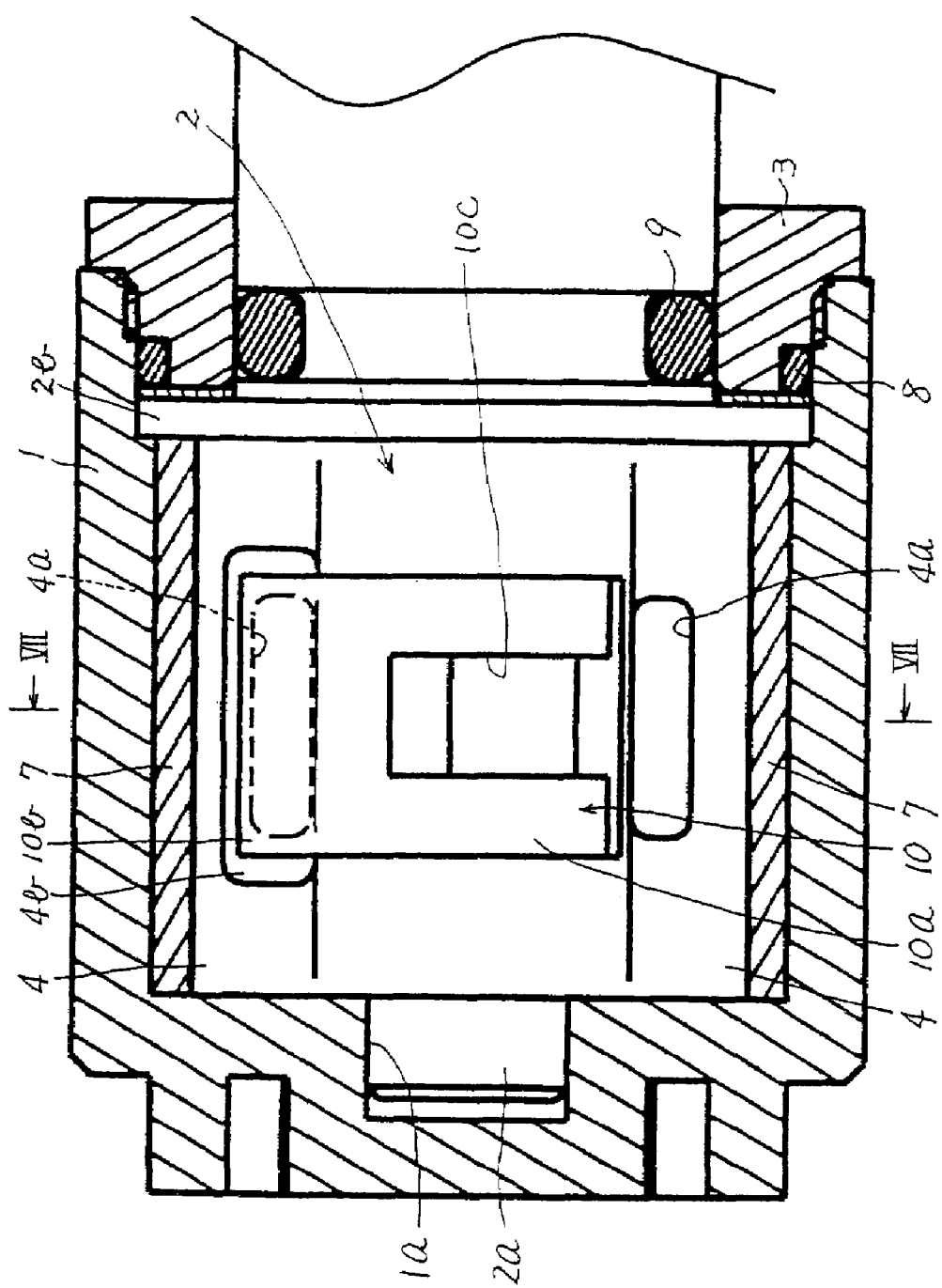
FIG. 6 is a sectional view of a rotating damper of a second embodiment.
Figure 7:
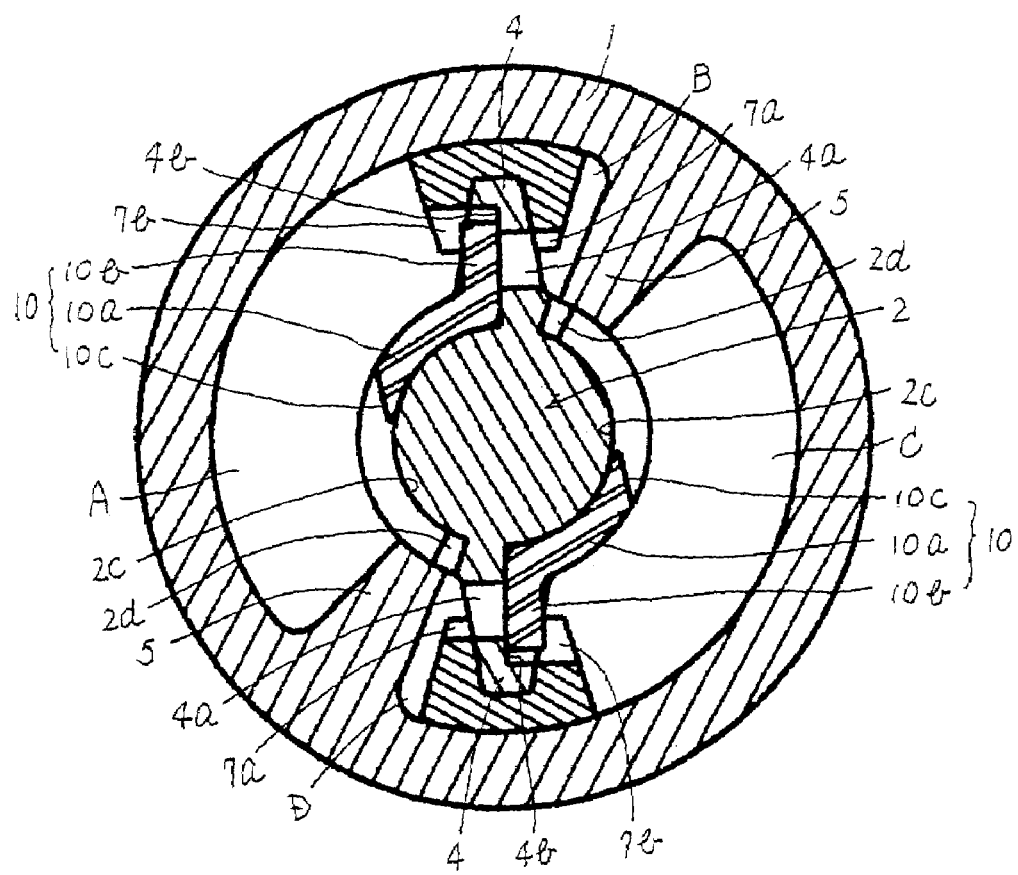
FIG. 7 is a sectional view taken along the VII-VII line in FIG. 6.

A second embodiment illustrated in FIGS. 6 and 7 uses a valve body 10 instead of the valve body 6 of the first embodiment. The valve body 10 has curving portions 10a and valving portions 10b, and a notch 10 is formed in the curving portion 10a. Another difference from the first embodiment is that the bypass groove 2e is not provided in the rotating shaft 2. Instead of the bypass 2e that is formed in the rotating shaft 2 of the first embodiment, the notches 10c formed in the curving portions 10a serve as a bypass. The remaining structure is the same as that of the first embodiment, and therefore the same components are designated by the same reference numerals as those in the first embodiment. Description of the individual components is omitted.

Next, operation of the rotating damper in the second embodiment is described.

In the state shown in FIG. 7, the pressure chambers A and B respectively communicate with the pressure chambers D and C via the gaps 2d and the band-shaped recesses 2c corresponding to the notches 10c at the leading ends of the divider walls 5.

The rotating shaft 2 is rotated counterclockwise from the position shown in FIG. 7. Then, the pressure chambers A and C are compressed, and the viscous fluid in the pressure chambers A and C flows into the pressure chambers D and B via the band-shaped recesses 2c. The rotating shaft 2 is further rotated counterclockwise. Then, the entire surfaces of the leading ends of the divider walls 5 separate from the notches 10c and come into contact with the curving portions 10a, whereupon communications between the pressure chambers A and D and between the pressure chambers B and C via the band-shaped recesses 2c are blocked.

In addition, when the rotating shaft 2 is rotated counterclockwise, pressure in the pressure chambers A and C presses the valving portions 10b of the valve body 10 against the blades 4, thereby closing the flow passages 4a.

Thus, the fluids in the pressure chambers A and C under high pressure flow into the respectively adjacent pressure chambers B and D via slight clearances between the inner periphery of the casing 1 and the spacers 7 provided on the leading ends of the blades 4. Alternatively, the fluids in the pressure chambers A and C under high pressure flow into the respectively adjacent pressure chambers D and B via slight clearances between the outer periphery of the rotating shaft 2 and the leading ends of the divider walls 5. At this point, the limiting mechanism of the present invention functions to exert the damper function.

On the other hand, when the rotating shaft 2 is rotated clockwise, the fluid pressure in each of the compressed pressure chambers B and D acts on the corresponding valving portion 10b via the flow passage 4a of the blade 4. Hence, the valve body 10 rotates counterclockwise with respect to the rotating shaft at an angle corresponding to the gap 2d.

That is, the valving portion 10b moves away from the blade 4 to open the flow passage 4a. The fluids in the pressure chambers B and D flow into their respectively adjacent pressure chambers A and C via the flow passages 4a, so that the flow is not limited and the damper function is not exerted.

In the rotating damper of the second embodiment, the curving portions 10a are supported between the outer periphery of the rotating shaft 2 and the divider walls 5, thereby maintaining the valve body 10. For this reason, the rotating damper according to the present invention has no need of a member for maintaining the valve body 10 within the rotation range of the rotating shaft as used in conventional devices, and such a member does not narrow the rotation range of the rotating shaft 2. In particular, when highly viscous fluid is sealed in order to allow for higher torque, it is possible to ensure a large rotation angle without impairment of the durability of each component.

Figure 8:
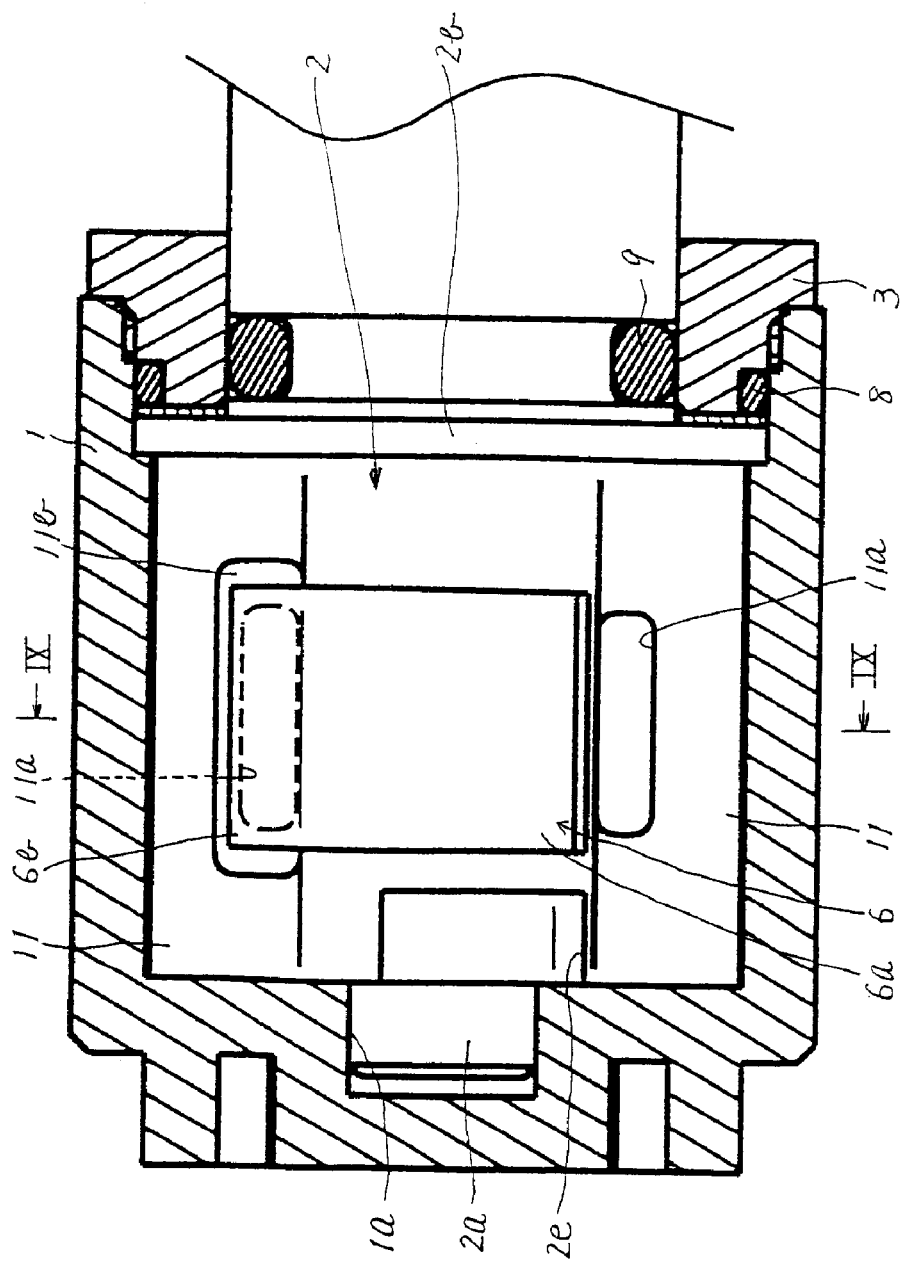
FIG. 8 is a sectional view of a rotating damper of a third embodiment.
Figure 9:
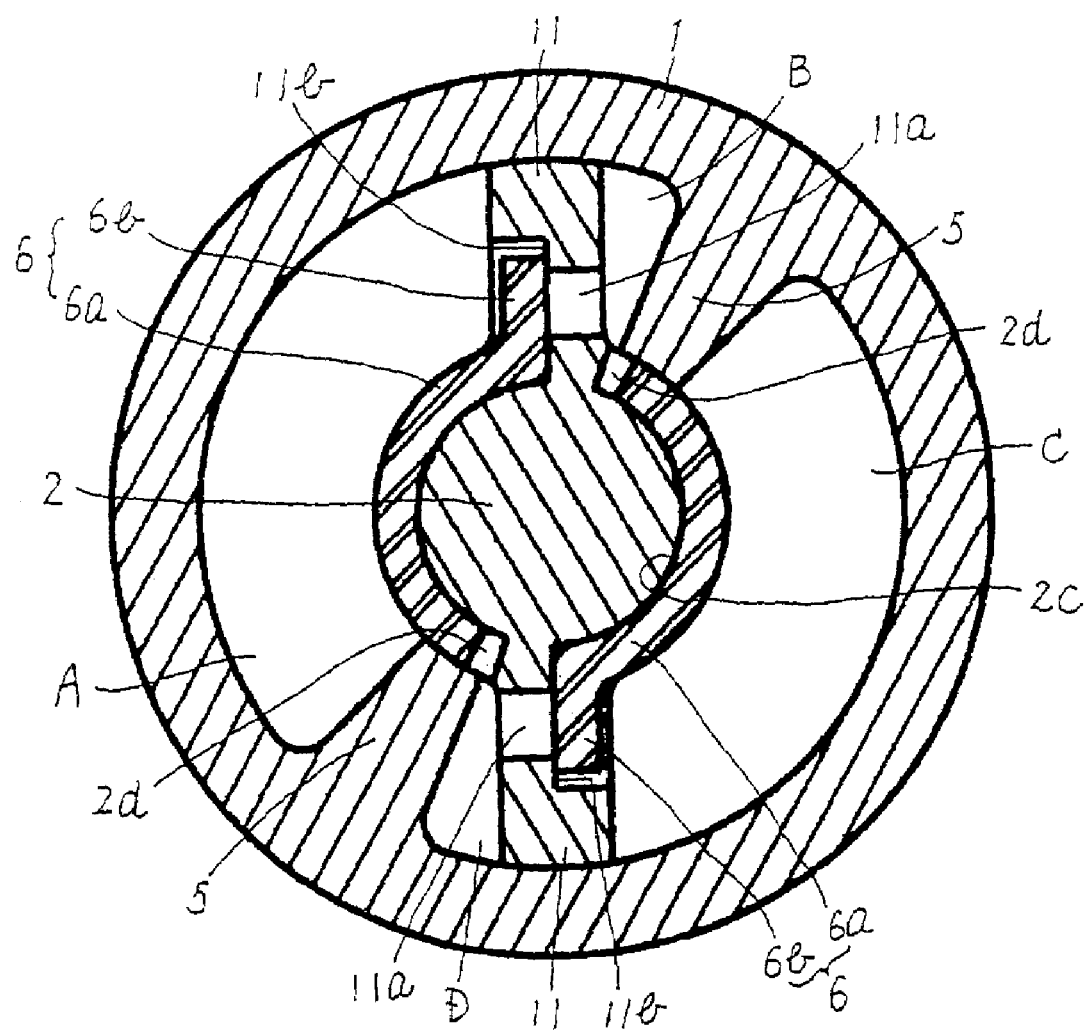
FIG. 9 is a sectional view taken along the IX-IX line in FIG. 8.

A third embodiment shown in FIGS. 8a and 9 has a pair of blades 11 formed on the outer periphery of the rotating shaft 2. The blade 11 differs in shape from the blade 4 of the first embodiment, but has the same function as that of the blade 4. The remaining structure is the same as that in the first embodiment, and the same components are designated with the same reference numerals as those in the first embodiment. Description of the individual components is omitted.

A flow passage 11a and a graded step 11b are formed in the blade 11. The leading end face of the blade 11 is in direct contact with the inner periphery of the casing 1. Therefore, the spacer 7 of the first embodiment is not used in the third embodiment, which serves to simplify the structure.

The rotating damper in the third embodiment operates as in the case of the first embodiment. More specifically, when the rotating shaft 2 is rotated clockwise, the valving portion 6b moves in the range of the gap 2d and separates from the graded step 11b of the blade 11 so as to open the flow passage 11a. Hence, the adjacent pressure chambers communicate with each other and the fluid flows unhindered.

On the other hand, when the rotating shaft 2 is rotated counterclockwise, the valving portion 6b blocks the flow passage 11a of the blade 11. However, while the divider wall 5 is kept facing or overlapping the bypass groove 2e formed in the rotating shaft 2 (see FIG. 8), the fluid flows via the bypass groove 2e. The bypass groove 2e moves past the divider wall 5, thereupon the limiting mechanism triggers and the damper function is exerted.

As in the cases of the first and second embodiments, the rotating damper in the third embodiment is capable of ensuring a large angle of relative rotation for the rotating shaft 2 and the casing 1 even when highly viscous fluid is used.

Figure 10:
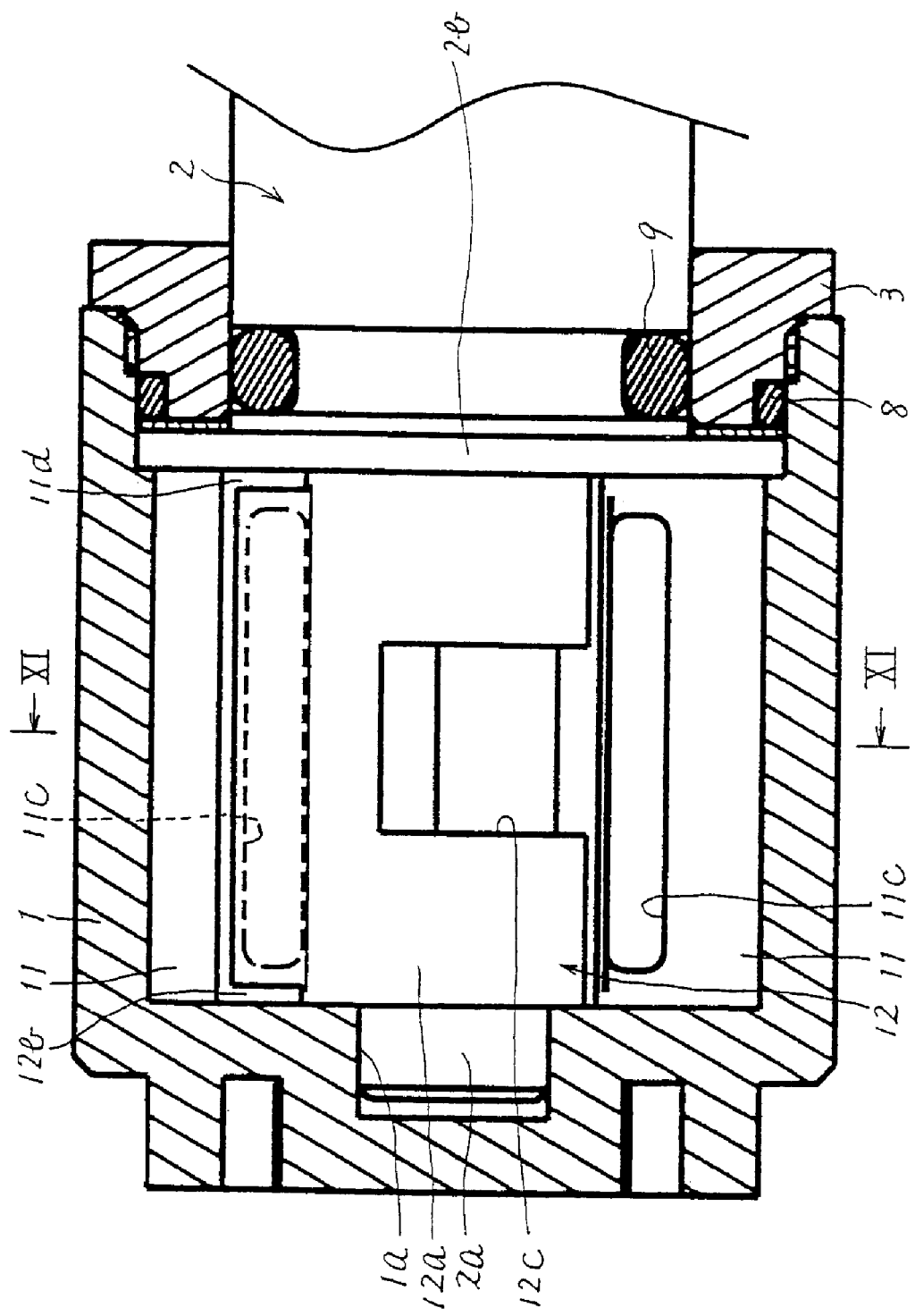
FIG. 10 is a sectional view of a rotating damper of a fourth embodiment.
Figure 11:
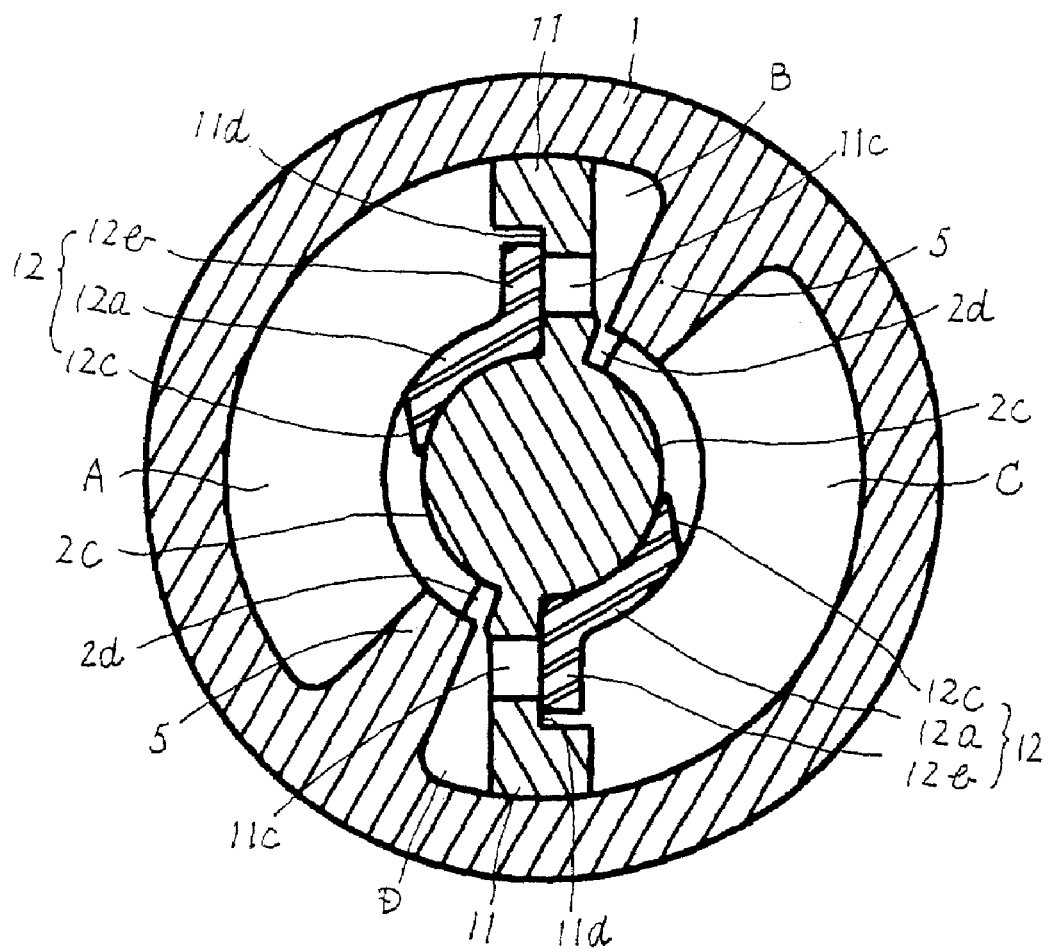
FIG. 11 is a sectional view taken along the XI-XI line in FIG. 10.
Figure 12:
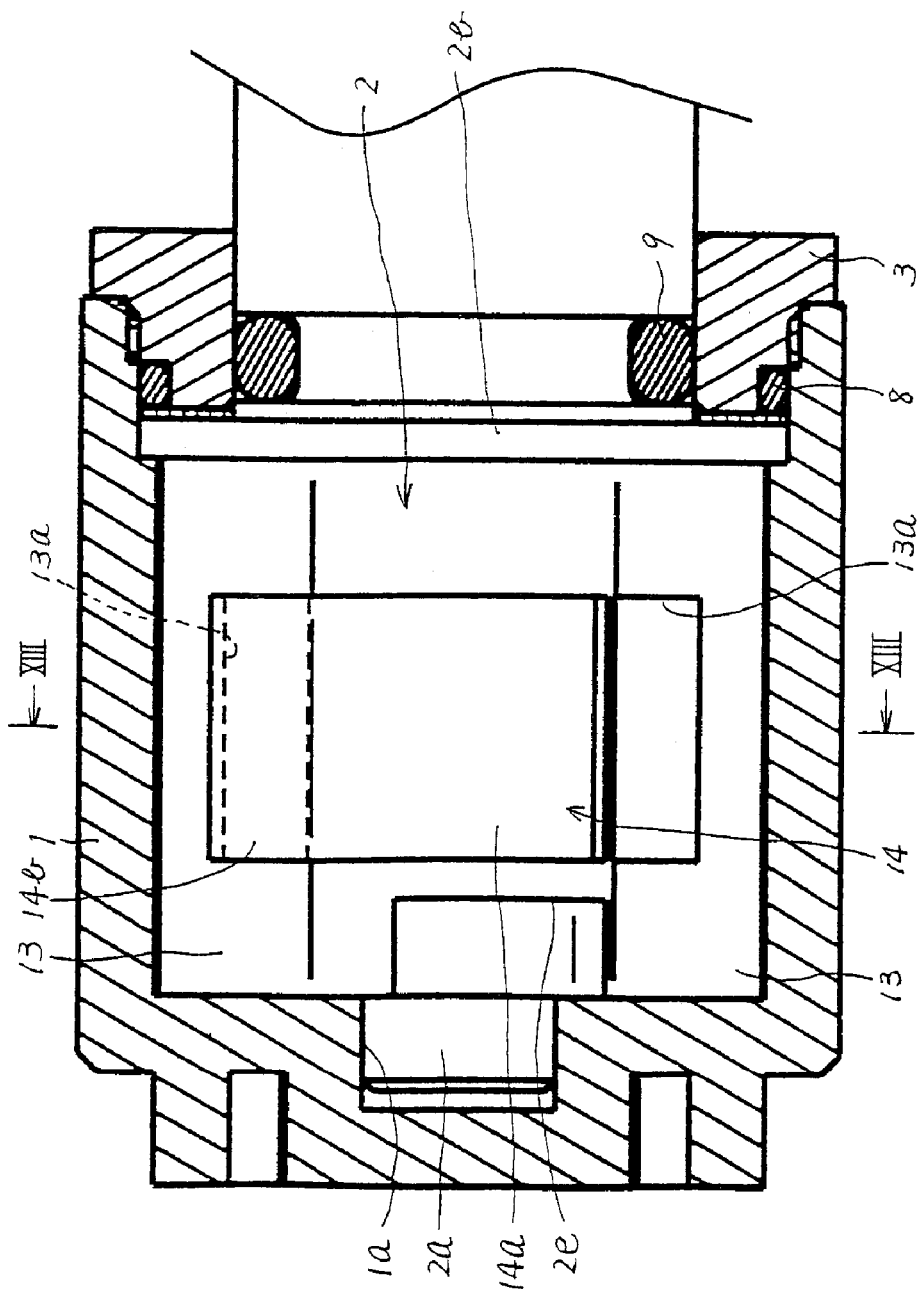
FIG. 12 is a sectional view of a rotating damper of a fifth embodiment.

A fourth embodiment shown in FIGS. 10 and 11 differs from the third embodiment in that a flow passage 11c and a graded step 11d are formed generally along the full length of the side face of each blade 11 extending in the axis direction. A valve body 12 of extended length in the axis direction is used to allow the closing of the flow passage 11c. The step 11d is formed along the full length of the blade 11, and the valve body 12 is provided in a range slightly shorter than the length of the step 11d. The flow passage 11c is formed in a range slightly shorter than the length of the valve body 12.

The valve body 12 has curving portions 12a and valving portions 12b. Each of the curving portions 12a winds along the outer periphery of the rotating shaft 2 and supported between the rotating shaft 2 and the divider wall 5 of the casing 1. The fourth embodiment is the same as the second embodiment in that notches 12c are formed in the curving portions 12a and serve as a bypass. In other words, the flow limiting mechanism according to the present invention triggers or not, depending upon a relative position of the notch 12c and the divider wall 5.

The rotating damper in the fourth embodiment operates as in the case of the aforementioned embodiments, and a detailed description is omitted. Even if highly viscous fluid is sealed in all pressure chambers A to D, the rotating damper of the fourth embodiment has the same effect of ensuring a large rotation angle without impairing the durability of each component as that in the aforementioned embodiments.

However, if the flow passage 11c formed in the blade 11 has the large opening area as in the case of the fourth embodiment, resistance of the flow passing through the flow passage 11c is extremely low when the limiting mechanism does not function, that is, the rotating shaft is rotated clockwise from the position shown in FIG. 11. Therefore, as compared with the rotating dampers in the aforementioned embodiments, torque generated when the limiting mechanism functions is equal, but it is also possible to more smoothly rotate the rotating shaft 2 when the limiting mechanism does not function.

A fifth embodiment shown in FIGS. 12 to 16 has structure in which a valving portion 14b is fitted into a flow passage 13a formed in the blade 13. The components identical to those in the aforementioned embodiments are designated with the same reference numerals, and a detailed description is omitted.

Figure 14:
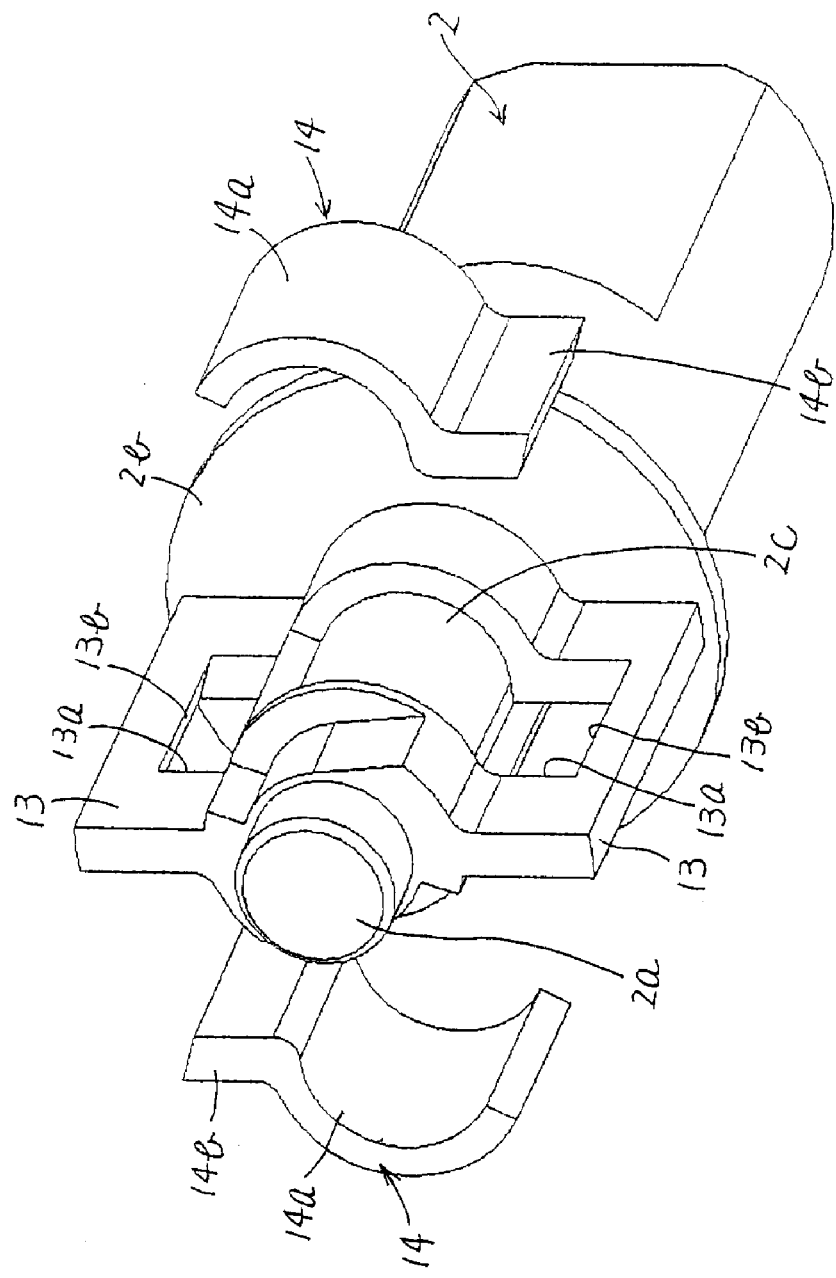
FIG. 14 is a perspective view of the fifth embodiment of the damper without a casing.
Figure 15:
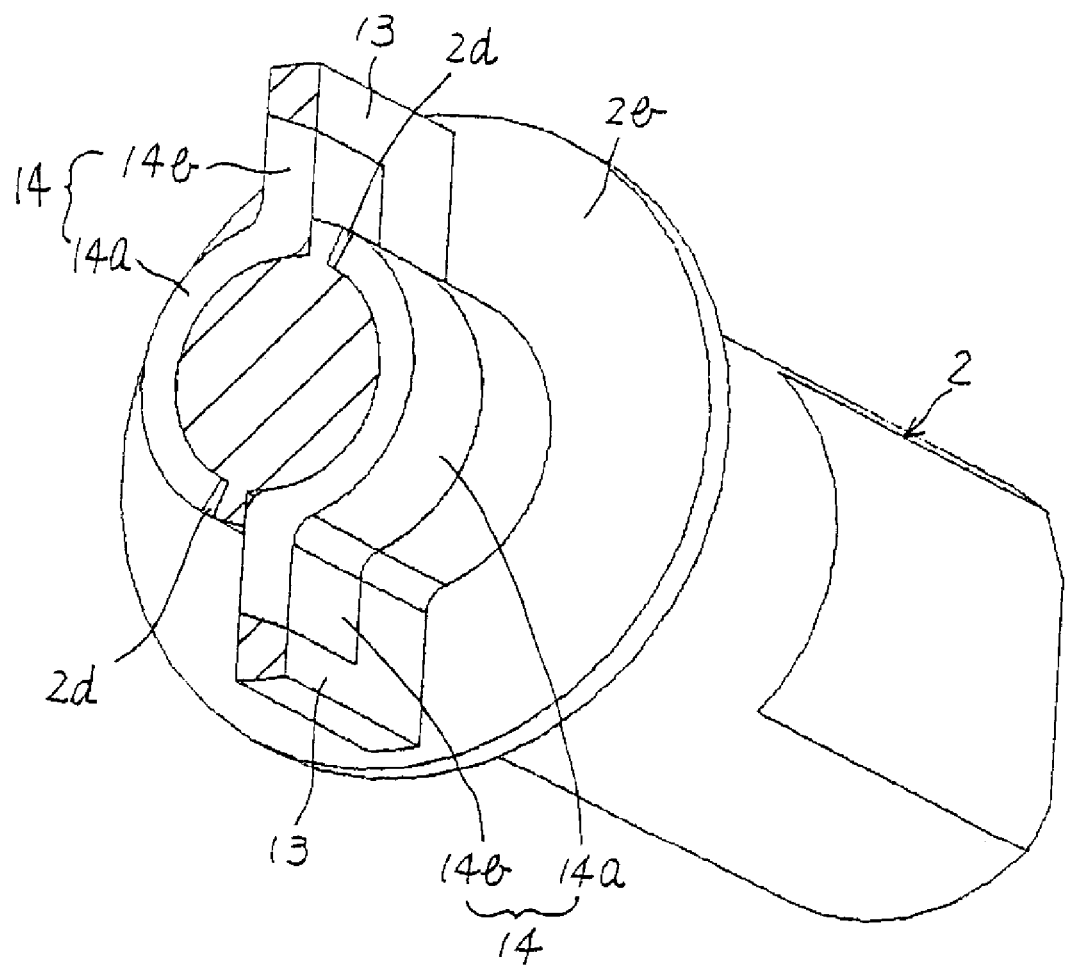
FIG. 15 is a view when the perspective view of FIG. 14 is cut along the XIII-XIII line in FIG. 12.
Figure 16:
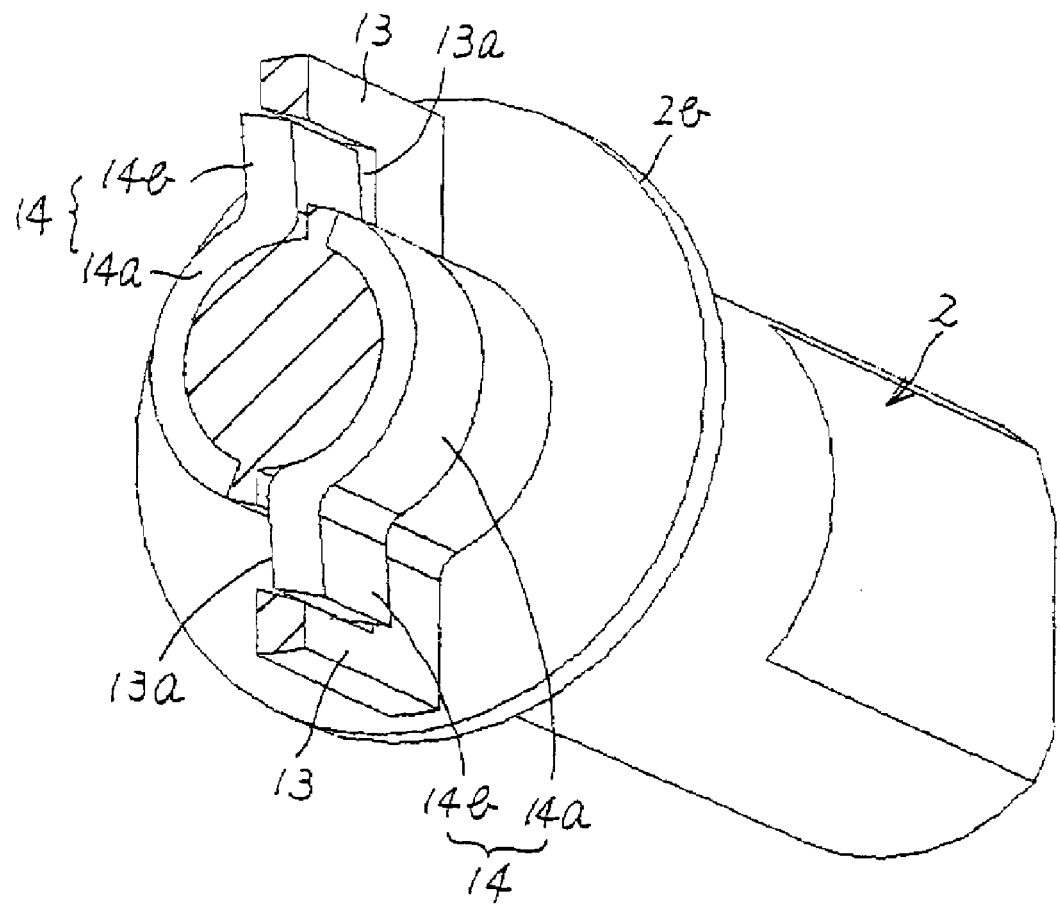
FIG. 16 is a view of the damper in which the rotating shaft is rotated from the position shown in FIG. 15 so that a flow passage is opened.

FIGS. 14 to 16 show the rotating damper without the casing 1. FIG. 14 shows the valve body 14 detached from the rotating shaft 2. FIGS. 15 and 16 are perspective views of the rotating shaft 2 and the valve body 14 attached thereto when cut along the XIII-XIII line in FIG. 12.

The rotating damper of the fifth embodiment has a pair of blades 13 provided on the outer periphery of the rotating shaft 2 and a flow passage 13a formed in each blade 13.

Figure 13:
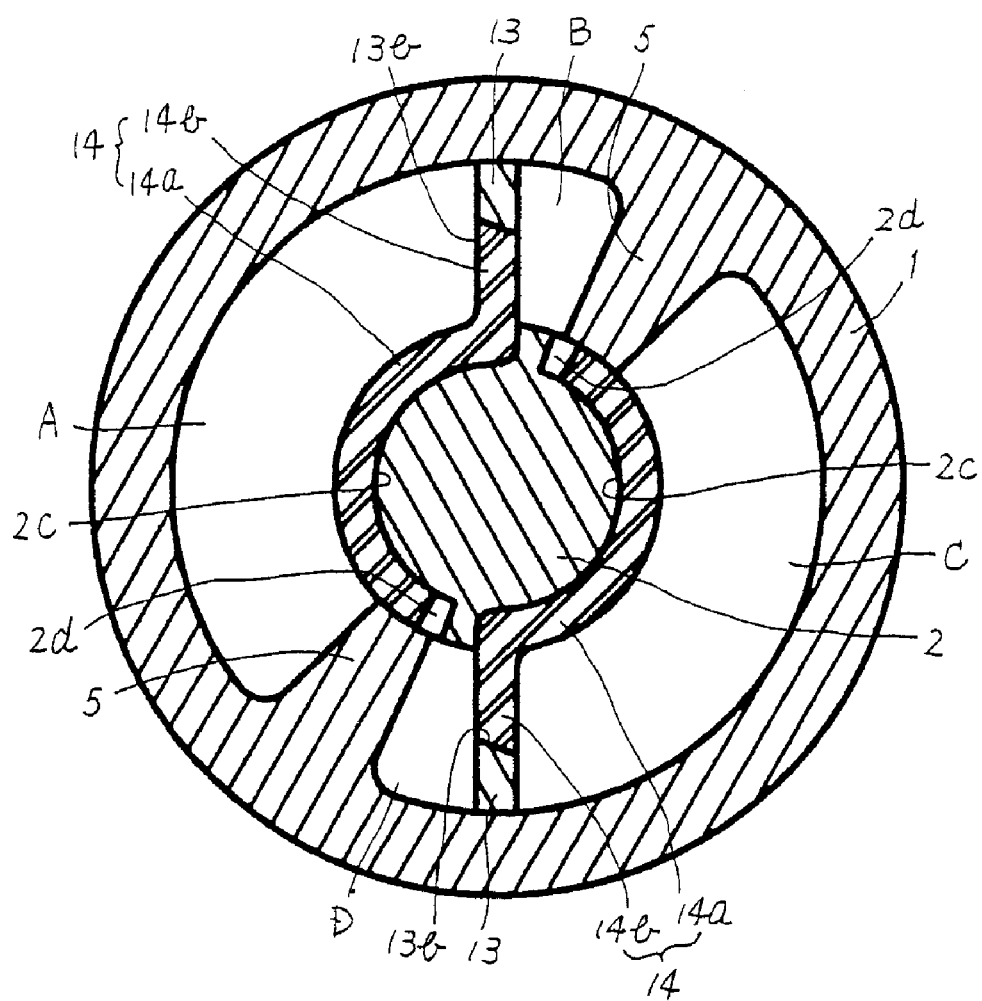
FIG. 13 is a sectional view taken along the XIII-XIII line in FIG. 12.

The flow passage 13a has one open end facing the pressure chamber A that is larger than the other open end facing the pressure chamber B, and has an inclined face 13b extending in the thickness direction of the blade 13. The valve body 14 includes a valving portion 14b that fits properly into the flow passage 13a. A leading end of the valving portion 14b has an inclined face corresponding to the inclined face 13b. The valve body 14 includes the valving portion 14b and a curving portion 14a. The curving portion 14a is fitted into the band-shaped recess 2c formed in the outer periphery of the rotating shaft 2. The band-shaped recess 2c is longer in length than that of the curving portion 14a. Therefore, when the valving portion 14b is fitted into the flow passage 13a as illustrated in FIGS. 13 and 15, a gap 2d is created at the end of the curving portion 14a opposite to the valving portion 14b. Accordingly, the valve body 14 is rotatable relative to the rotating shaft 2 at an angle corresponding to the gap 2d.

When the rotating shaft 2 is rotated clockwise from the position shown in FIGS. 13 and 15, the valving portion 14b moves away from the flow passage 13a of the blade 13 to open the flow passage 13a as shown in FIG. 16. Thereupon, the fluid flows from the pressure chambers B and D to the pressure chambers A and C to allow for smooth rotation of the rotating shaft 2.

On the other hand, when the rotating shaft 2 is rotated counterclockwise, the pressure of each of the pressure chambers A and C presses the valving portion 14b against the inclined face 13b of the flowpassage 13a to block the flow passage 13a. Therein, the relative positioning of the bypass groove 2e formed in the rotating shaft 2 and the divider walls 5 of the casing 1 activates the flow limiting mechanism, resulting in the damper function.

Such a rotating damper is not provided with any member for holding the valve body 14 opening and closing the flow passage 13a in the blade 13 so that the member would narrow the rotation range of the blade 13. Accordingly, as in the cases of the aforementioned embodiments, it is possible to provide a large rotation angle, particularly with use of highly viscous fluid to allow for higher torque.

In particular, as in the fifth embodiment, if the valving portion 14b is accommodated within the flow passage 13a formed in the blade 13, the total thickness of the blade and the valving portion can be decreased as compared with those of the other embodiments. Hence, it is possible to increase the capacity of each of the pressure chambers, resulting in an increase in rotation angle.

Figure 17:
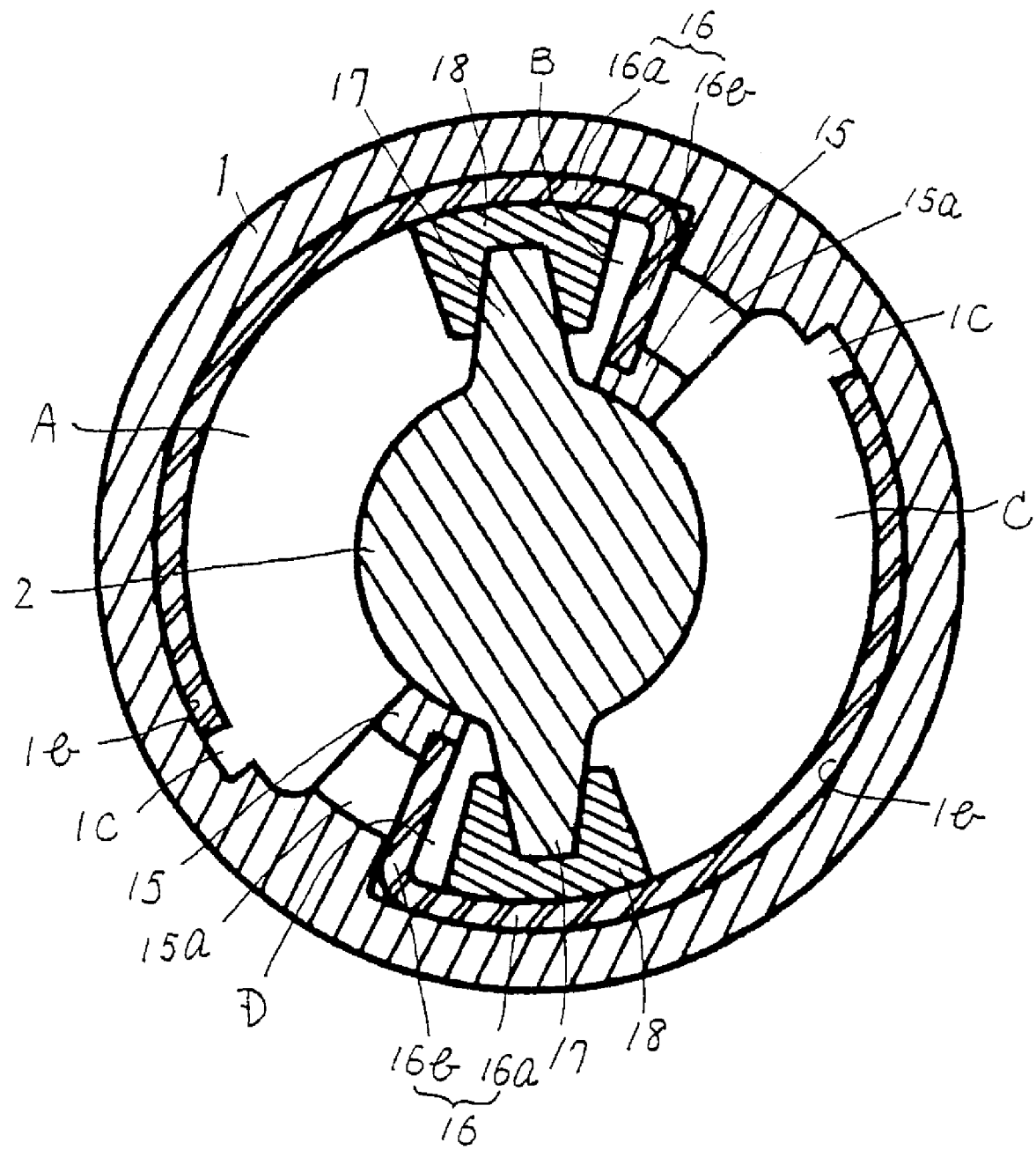
FIG. 17 is a sectional view of a rotating damper of a sixth embodiment.
Figure 18:
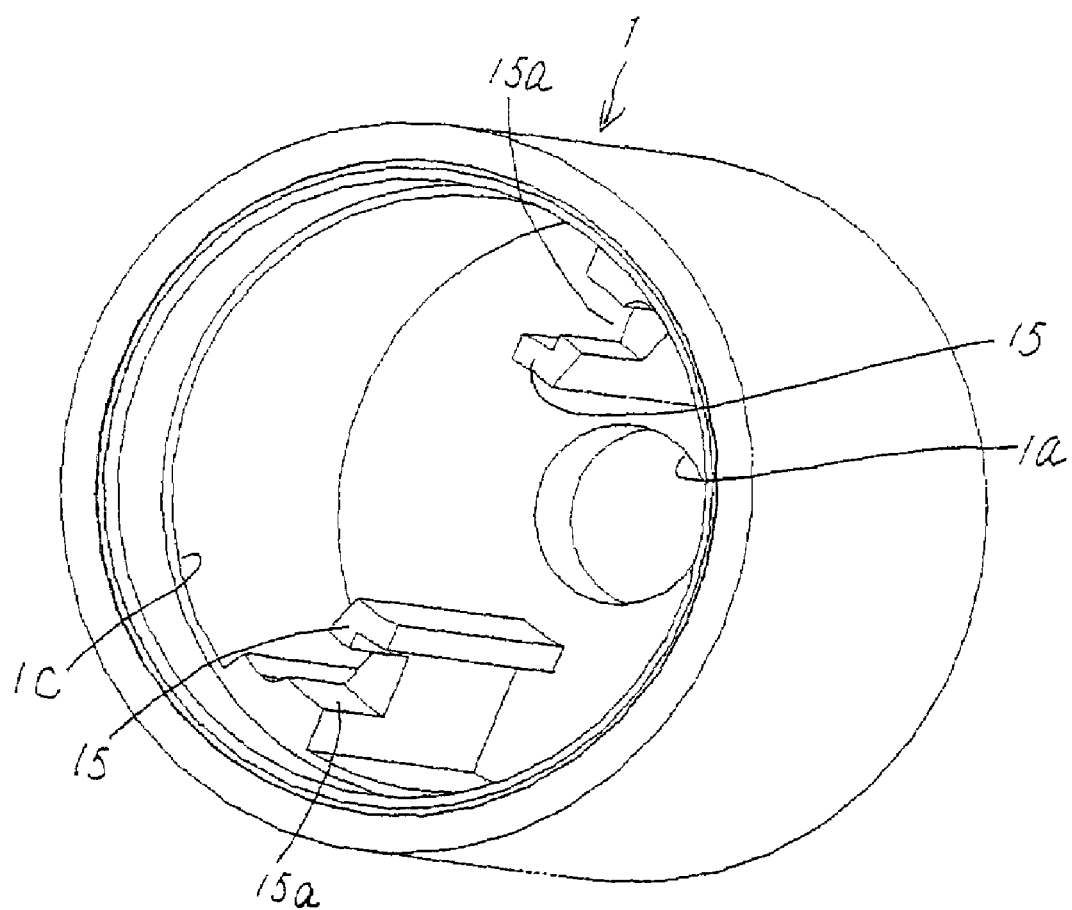
FIG. 18 is a perspective view of a casing of the rotating damper according to the sixth embodiment.

A sixth embodiment shown in FIGS. 17 and 18 differs from the aforementioned embodiments in that a valve body 16 is provided on the inner periphery of the casing 1, but the sixth embodiment is identical in all other embodiments in terms of operating the damper.

FIG. 17 is a cross-sectional view at right angles to the rotating shaft. FIG. 18 is a perspective view of the casing 1.

On the inner periphery of the casing 1, divider walls 15 that correspond to the first divider walls of the present invention are provided. A flow passage 15a is formed in each of the divider walls 15. Band-shaped recesses 1b are formed in portion of the inside wall of the casing 1 but not on the divider walls 15.

The valve body 16 includes curving portions 16a and valving portions 16b. Each of the curving portions 16a is fitted into the band-shaped recess 1b so as to follow the shape of the casing 1. A gap 1c is formed between the band-shaped recess 1b and the curving portion 16a. The valve portion 16 moves in a range of the gap 1c.

Blades 17 are formed on the outer periphery of the rotating shaft 2. A leading end of the blade 17 is crowned with a spacer 18. The spacer 18 moves together with the blade 17. The curving portions 16*a* of the valve body 16 are supported between the spacers 18 and the casing 1. Note that, when the pressure chambers A and C come reach a high pressure state and the pressure acts on the valve body 16 via the flow passages 15*a*, the valve body 16 moves away from the divider walls 15 and is held by a sandwiching force required to open the flow passage 15*a*.

In the rotating damper of the sixth embodiment, when the rotating shaft 2 is rotated counterclockwise relatively to the casing 1, pressure in the pressure chambers A and C are built up to move the valving portion 16*b*, resulting in fluid flowing from the pressure chamber A to the pressure chamber D and from the pressure chamber C to the pressure chamber B through the flow passages 15*a*.

On the other hand, when the rotating shaft 2 is rotated clockwise, pressure in the pressure chambers B and D is built up, so that the valving portions 16*b* are pressed against the divider walls 15 to block the flow passages 15*a*. Accordingly, the fluid flows through a slight clearance between the leading end of each divider wall 15 and the rotating shaft 2 and a slight clearance between each spacer 18 and the inner periphery of the casing 1. At this point, the flow limiting mechanism functions. That is, the damper function is exerted.

The rotating damper of the sixth embodiment has each curving portion 16*a* of the valve body 16 supported between the inner periphery of the casing 1 and the blade 17 by way of the spacer 18. Therefore, as in the cases of the aforementioned embodiments, the range of rotation of the rotating shaft 2 is not decreased by a member provided for holding the valve body. Accordingly, it is possible to ensure a large rotation angle even when highly viscous fluid is used to allow for higher torque.

Figure 19:
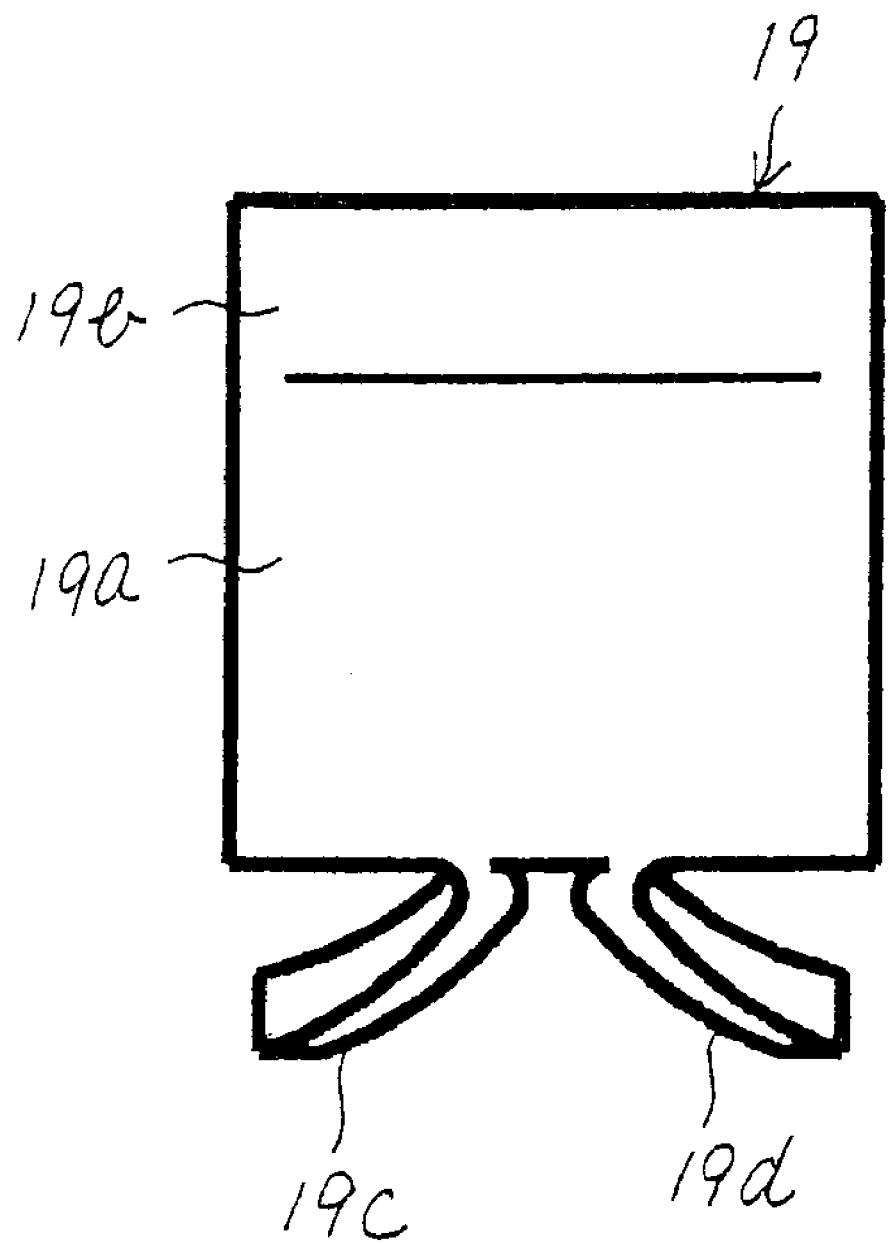
FIG. 19 is a front view of a valve body in a seventh embodiment.
Figure 20:
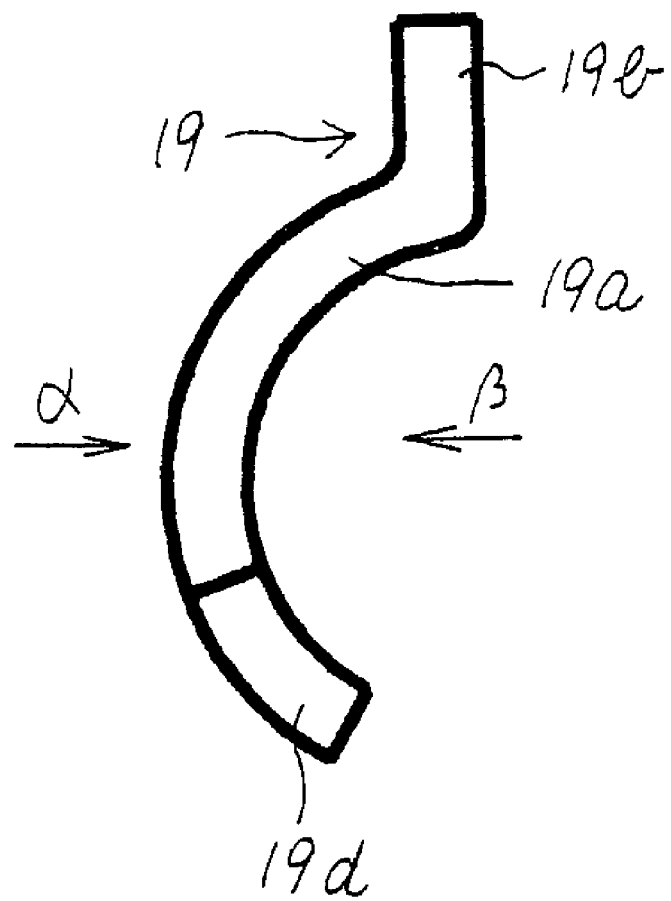
FIG. 20 is a side view of the valve body in the seventh embodiment.
Figure 21:
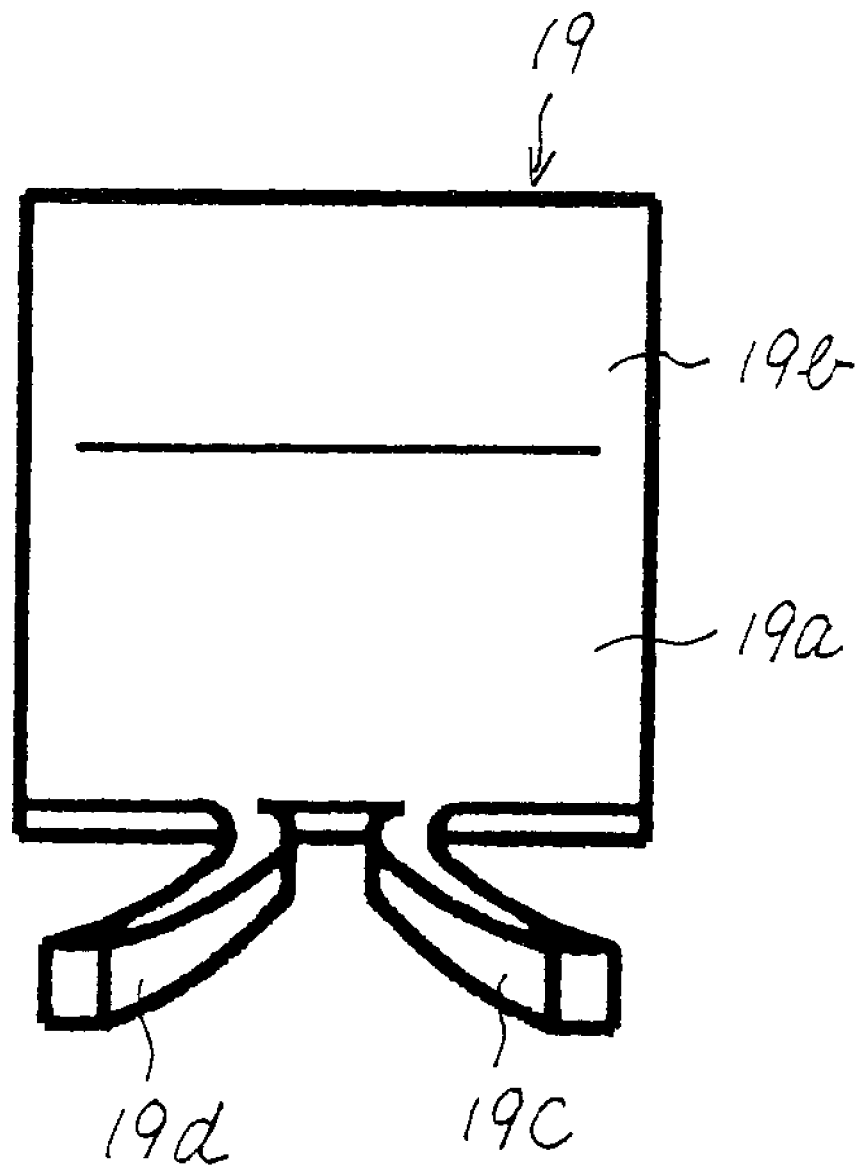
FIG. 21 is a back view of the valve body in the seventh embodiment.

FIGS. 19 to 21 show a valve body 19 in a seventh embodiment. The valve body 19 includes curving portions 19*a* and valving portions 19*b*, and further spring portions 19*c* and 19*d* are provided at an end of each curving portion 19*a*. FIG. 19 is a front view of the valve body 19 shown in FIG. 20 when seen from the direction indicated by arrow α. Similarly, FIG. 21 is a back view of the valve body 19 when seen from the direction indicated by arrow β.

Instead of the valve body 6 illustrated in the first embodiment shown in FIGS. 1 to 5, the valve body 19 can be attached to the outer periphery of the rotating shaft 2. FIGS. 2 to 5 may also be referred to for the following description.

The rotating damper of the seventh embodiment using the valve body 19 operates in the same manner as in the rotating dampers of the aforementioned embodiments, and has the same effect of ensuring a large range of relative rotation for the rotating shaft and the casing.

However, the spring force of the spring portions 19*c* and 19*d* presses the valve body 19 against the blades 4 provided on the rotating shaft 2 (see FIGS. 2 to 5). For this reason, when the rotating shaft 2 is rotated clockwise and the fluid pressure acts in the direction where the valvings 19*b* are separated from the blades 4, the valve body 19 moves against the spring force to open the flow passages 4*a* of the blades 4. However, when the rotating shaft 2 stops, the valve body 19 moves back towards the blades 4 by the spring force of the spring portions 19*c* and 19*d*. In other words, at the time the direction of rotation is reversed, the valving portions 19*b* have already been in a position to close the flow passages 4*a*, that is, in a position capable of limiting the flow of fluid. Hence, when the rotating shaft 2 reverses the direction of rotation at this position, the limiting mechanism of the fluid flow is immediately initiated.

If such spring portions 19*c* and 19*d* are not provided, and the rotating shaft 2 is rotated in the opposite direction from the open state of the flow passages 4*a*, time is required for the valve body 19 to move to close the flow passages 4*a*, resulting in the occurrence of so-called "backlash". However, if the spring portions are provided as in the seventh embodiment, it is possible to prevent such backlash.

Spring portions, such as the spring portions 19*c* and 19*d* as described above, can be provided in any valve body as described in the first to sixth embodiments for prevention of backlash.

As described hitherto, the rotating damper illustrated in each of the first to the seventh embodiments need not include any member for holding the valve body within the range of rotation of the blade member provided on the rotating shaft, thus allowing for an increase in the rotation angle of the damper. Further, in each of the first to seventh embodiments, the thickness of the divider wall formed on the inner periphery of the casing 1 is decreased, resulting in a further increase in the rotation angle.

Further, the spacer provided at the top end of the divider wall or the blade in each embodiment may be provided on either the divider wall or the blade, or neither the divider nor the blade. As matter of course, the spacers may also be provided on both the divider wall and the blade.

Each of the aforementioned embodiments has described examples where the rotating shaft rotates relative to the stationary casing. However, the rotating shaft and the casing perform relative rotation. Accordingly, if the casing is rotated relative to the rotating shaft, the same operation is implemented.

I claim:

1. A rotating damper, comprising:

a rotating shaft (2) that is provided inside a casing (1) and rotatable relatively to the casing (1);

first divider walls (15) that are provided on an inner periphery of the casing (1) and in either direct or indirect contact with the rotating shaft (2);

second divider walls (17) that are provided on an outer periphery of the rotating shaft and in either direct or indirect contact with the inner periphery of the casing;

a plurality of pressure chambers (A, B, C, D) defined by the first and second divider walls (15, 17);

a limiting mechanism for limiting a flow of fluid between the pressure chambers;

a flow passage (15*a*) provided in the first divider wall (15) for communication of the fluid between the pressure chambers; and a check valve mechanism for permitting a flow of fluid in one direction from one of the pressure chambers to an adjacent pressure chamber of the pressure chambers, and inhibiting a flow of fluid from the adjacent pressure chamber to the one pressure chamber, the check valve mechanism comprising:

curving portions (16*a*) moving on and along an inner periphery of the casing (1) and supported between the casing (1) and the second divider wall (17); and valving portions (16*b*) each joining to the curving portion (16*a*), wherein depending upon turning movement of the check valve mechanism, each of the valving portions (16*b*) opens the flow passage (15*a*) for the flow of fluid from the one pressure chamber to the adjacent pressure chamber, and closes the flow passage (15*a*) for the flow of fluid from the adjacent pressure chamber to the one pressure chamber.

2. A rotating damper according to claim 1, wherein notches are formed in one of three positions of the curving portion (16*a*), the outer periphery of the rotating shaft (2), and the inner periphery of the casing (1), and timing of activation of the limiting mechanism is adjusted in accordance with a relative position of the notch and either the first divider walls (15) or the second divider walls (17).

* * * * *